Nov. 17, 1970     H. R. SPEDDEN ET AL     3,540,880
PROCESS AND APPARATUS FOR THE PRECIPITATION OF
SUBSTANCES FROM SOLUTION, USING
SOLID PRECIPITANTS
Filed June 14, 1967
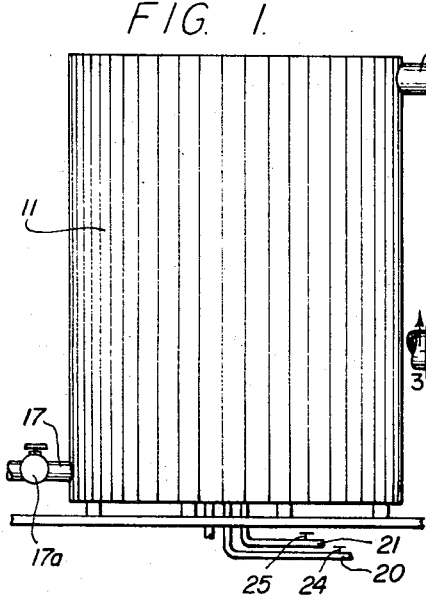
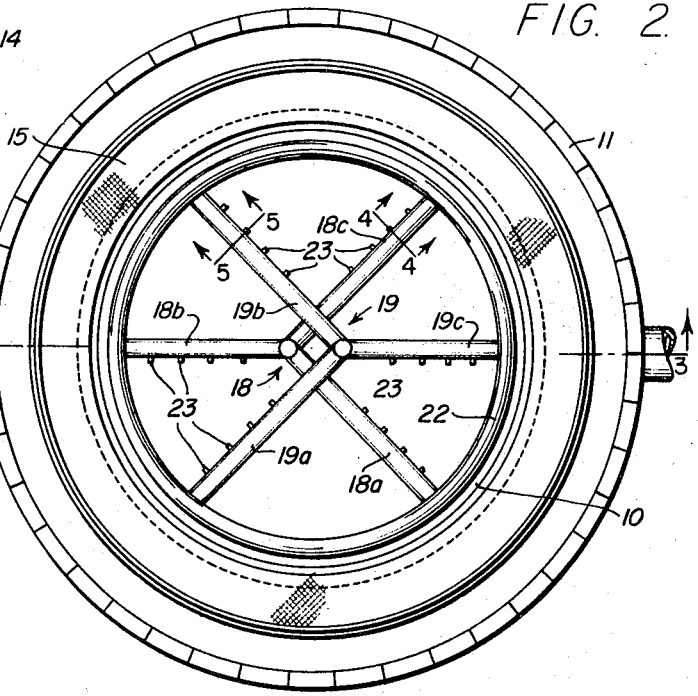
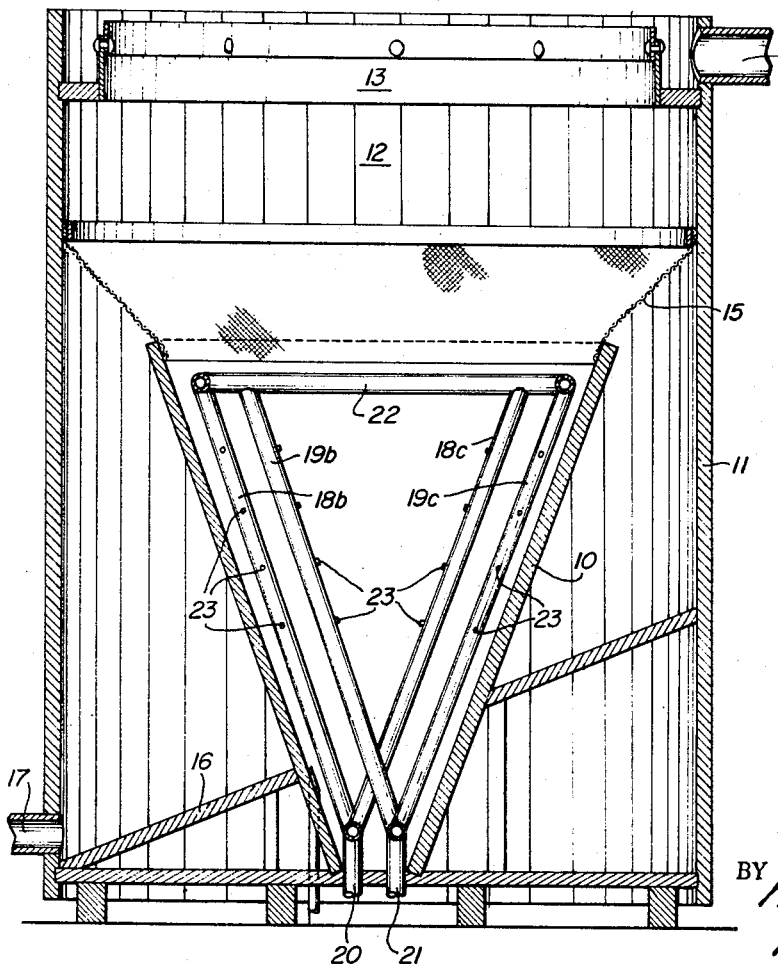
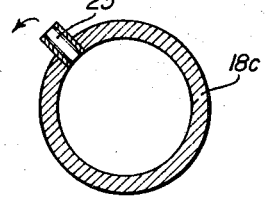
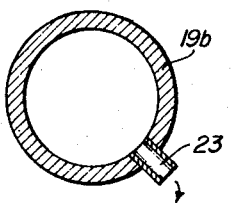
INVENTOR.
HENRY RUSH SPEDDEN
EMIL EDWARD MALOUF
BY
ATTORNEYS

United States Patent Office

3,540,880
Patented Nov. 17, 1970

3,540,880
PROCESS AND APPARATUS FOR THE PRECIPITATION OF SUBSTANCES FROM SOLUTION, USING SOLID PRECIPITANTS
Henry Rush Spedden and Emil Edward Malouf, Salt Lake City, Utah, assignors to Kennecott Copper Corporation, New York, N.Y., a corporation of New York
Filed June 14, 1967, Ser. No. 645,956
Int. Cl. C22b 25/04; B01f 5/02
U.S. Cl. 75—109    5 Claims

ABSTRACT OF THE DISCLOSURE

Improvements in a known process and apparatus whereby pregnant solution is projected as high pressure jet streams against solid precipitant, in a treatment vessel defining a reaction zone, by means of jet nozzles spaced apart along piping that makes up a manifold framework. One improvement comprises directing the jet nozzles and the jet streams issuing therefrom substantially concentrically with and, preferably, somewhat upwardly in the treatment vessel, so as to produce a swirling and gradually rising motion of the body of solution that collects in the vessel. Such motion is in the direction of travel of the jet streams, and serves to effectively sweep dislodged precipitate from the reaction zone. Another improvement comprises alternately directing similar jet streams in the opposite direction, circularly of the treatment vessel by means of a second jet-nozzle-provided framework manifold closely interpositioned relative to the first.

CROSS-REFERENCE TO RELATED APPLICATIONS

This invention is related to and constitutes an improvement on the process and apparatus disclosed by copending application Ser. No. 319,302 filed Oct. 28, 1963, now U.S. Pat. No. 3,333,953, jointly by Stuart R. Zimmerley and Emil E. Malouf, one of the applicants herein.

BACKGROUND OF THE INVENTION

Field

The invention relates to the art of precipitating substances, particularly metals such as copper from solutions containing same on solid precipitants such as metallic iron, particularly iron scrap such as de-tinned and crushed or shredded tin cans.

Prior art

It has long been common practice to precipitate metals from solution on other metals higher in the electromotive series than the metal to be precipitated. Thus, the cementation of copper on metallic iron from weakly acid leach solutions is a usual method employed by the extractive metallurgical art. Conventional practice has been to run the pregnant solution down a launder containing scrap iron and to hose off and recover the precipitated copper at intervals.

Although there have been many patents issued through the years on various forms of apparatus utilizing treatment vessels of one kind or another, e.g. Sulman U.S. Pat. No. 587,408 dated Aug. 3, 1897, the conventional precipitation launder has been utilized in most commercial installations. However, there have been recent innovations that have held high promise for more efficient and economical recoveries. In addition to the process and apparatus of the aforementioned copending application Ser. No. 319,302, these include processes and apparatus of the following patents: Hogue, U.S. Pat. No. 3,288,598, Nov. 29, 1966; Back et al., U.S. Pat. No. 3,154,411, Oct. 27, 1964.

SUMMARY OF THE INVENTION

It is a principal purpose of the present invention to make the process and apparatus of the afore-referred to application Ser. No. 319,302 more efficient.

This is accomplished by directing all the high pressure jet streams of incoming pregnant solution in generally the same direction concentric with, i.e. circularly of, the inverted conical treatment vessel within which the solution is forcefully discharged against the solid precipitant. In this way, not only is the normally adherent precipitated material effectively scrubbed from the surfaces of the solid precipitant, but it is swirled away from such surfaces and, either by reason of the rising current of solution in the treatment vessel or of a preferred somewhat upward direction of the jet streams of incoming pregnant solution, or of both, is most effectively carried from the primary reaction zone into the relatively quiescent settling zone that is maintained above such treatment vessel. Since the settling zone, in preferred practice and in preferred forms of the apparatus, extends outwardly above a catch receptacle surrounding the treatment vessel, so the carried precipitate will drop into the catch receptacle for recovery, the swirling motion will tend to carry the precipitate outwardly into the proper location for dropping into the catch recetpacle.

Greater efficiency of the prior process and apparatus is also attained by alternating the direction, circularly of the treatment vessel, of the jet streams of pregnant solution at intervals during the operation. This is best accomplished by closely interpositioning a second jet-nozzle-provided framework manifold relative to the first and providing a valved supply system for pregnant solution that will pass the inflowing solution into the two manifolds alternately at timed intervals.

DESCRIPTION OF THE DRAWINGS

The accompanying drawings illustrate a specific embodiment of apparatus representing what is presently regarded as the best mode of carrying out the invention in commercial practice.

FIG. 1 is a view in side elevation of apparatus corresponding to that shown in the afore-referred-to copending application Ser. No. 319,302;

FIG. 2, a considerably enlarged top plan view;

FIG. 3, a central vertical section taken on the line 3—3 of FIG. 2;

FIG. 4, a considerably enlarged, detail, horizontal section taken on the line 4—4 of FIG. 3; and FIG. 5, a similar horizontal section taken on the line 5—5 of FIG. 3.

DESCRIPTION OF THE PREFERRED EMBODIMENT

The illustrated apparatus is the same as that shown and described in the afore-referred-to copending application Ser. No. 319,302, except for the improvements of this invention. Thus, a treatment vessel 10 of inverted conical formation defining a reaction zone internally thereof is disposed wholly within a larger catch receptacle 11. Both vessel 10 and receptacle 11 have open tops for receiving a solid precipitant, such as light scrap iron in the form of de-tinned and shredded tin cans when copper is to be recovered from a solution pregnant therewith. Other types of metallic iron can also be used in such instances, e.g. the sponge iron indicated in the aforementioned Pat. No. 3,288, 598.

A peripheral overflow rim 10a is provided at the top of treatment vessel 10, and the walls of catch receptacle 11 rise thereabove to provide a quiescent zone 12, within which is a peripheral overflow launder 13 and a discharge pipe 14 for spent solution. A screen 15 separates the quiescent zone from the lower part of catch receptacle 11, to prevent precipitant in the quiescent zone from falling into such lower part along with the fine precipitate, which drops through the screen and collects on sloping floor 16 of the catch receptacle for periodic removal through pipe 17 when a valve 17a, FIG. 1, in such pipe is opened to permit part of the body of solution to flow out carrying precipitate along with it.

In accordance with the present invention and as one possible form thereof, two jet-nozzle-provided manifolds 18 and 19, respectievly, each constructed as an open framework of pipe having three divergent branches, 18a, 18b, 18c, and 19a, 19b, 19c respectively, are provided for the inflow of pregnant solution directly into treatment vessel 10 from respective supply pipes 20 and 21 leading from either a single high pressure source of pregnant solution or respective sources thereof. As can be seen from FIGS. 2 and 3 the two manifolds are closely interpositioned and, in the form shown, are structually interconnected by means of a top ring of pipe 22 that does not establish flow communication between the two manifolds.

The jet nozzles 23 of each manifold, instead of being directed diversely of the pipes 18a, 18b, 18c, and 19a, 19b, 19c of the two manifolds, so as to project jet streams of pregnant solution throughout the interior of the treatment vessel 10, as in prior apparatus of this type, are all directed in substantially the same direction, circularly of treatment vessel 10, so as to produce a swirling motion of the body of solution rising in such treatment vessel when either the one or the other of the two manifolds is active.

By comparing FIGS. 4 and 5, it can be seen that the jet nozzles 23 of the two manifolds are oppositely directed. Thus, when valve 24, FIG. 1, in supply pipe 20, controlling flow of solution to manifold 18, is open and valve 25 in supply pipe 21 is closed, swirling of the body of solution in the treatment vessel will be counterclockwise, and when valve 25 is open and valve 24 closed, swirling will be clockwise.

Although provision of the two solution inflow manifolds, with alternate activation at intervals, is preferred in many instances in order to most effectively dislodge stubbornly adherent precipitate from surfaces of the precipitant and to thereby expose fresh reactive surfaces to the pregnant solution, superior results over prior practice can be attained when only one manifold is employed and the inflowing solution is continuously swirled in only one direction. Moreover, although manually operated valves are here shown for alternating solution inflow between the two manifolds, time-operated valves of known construction can be employed in suitable manner for automatic operation. Also, although the nozzles 23 are here shown as horizontal, it is often advantageous to cant them somewhat upwardly so the jet streams issuing therefrom will aid the rising current of solution in carrying the dislodged precipitate into the quiescent zone.

Whereas this invention is here described and illustrated with respect to a certain preferred form thereof, it is to be understood that many variations are possible without departing from the subject matter particularly pointed out in the following claims, which subject matter we regard as our invention.

We claim:
1. In apparatus for the precipitation of substances from pregnant solutions, using solid precipitants, wherein a treatment vessel defines a reaction zones adapted to contain an upwardly extending mass of solid precipitant and an upwardly extending body of solution about and in reactive contact with said mass, and there are provided in said vessel means for introducing jet streams of pregnant solution into said body, including jet nozzles spaced along the height of the reaction zone, the improvement characterized by all the jet nozzles being arranged substantially concentrically of the treatment vessel and in a direction to discharge circularly of said vessel, said jet nozzles being disposed in upwardly extending sets, with the respective sets being arranged to discharge oppositely, and there being means for supplying pregnant solution alternately to the respective sets.

2. The improved apparatus of claim 1, wherein the sets include respective manifolds each of open frame construction having a plurality of upwardly extending frame members provided with a plurality of jet nozzles; and wherein the upwardly extending members of the respective manifolds are interpositioned relative to one another.

3. The improved apparatus of claim 2, wherein the upwardly extending members of the respective manifolds are interconnected by a structural member in common.

4. In a process for the precipitation of substances from pregnant solutions, using solid precipitants, wherein an upwardly extending body of such a solution is maintained within a reaction zone about an upwardly extending mass of a solid precipitant in reactive contact therewith, and additional pregnant solution is introduced into sadi body of solution along the height thereof as an upwardly extending series of jet streams that penetrate the said mass, the improvement characterized by arranging the jet streams of the series substantially concentric with the reaction zone and circularly thereof at intervals along its height, and discharging corresponding jet streams in the opposite direction at intervals during operation of the process so surfaces of the precipitant will be scrubbed by the jet streams first in one direction and then in the opposite direction.

5. The improved process of claim 4, wherein the solid precipitant is scrap iron and the solution is pregnant with copper values.

References Cited

UNITED STATES PATENTS

| | | | |
|---|---|---|---|
| 981,098 | 1/1911 | McCaskell | 23—271 |
| 1,071,447 | 8/1913 | MacDonald | 23—271 |
| 2,978,300 | 4/1961 | McCowen et al. | 23—271 X |
| 3,154,411 | 10/1964 | Back et al. | 75—109 |
| 3,333,953 | 8/1967 | Zimmerley et al. | 75—109 |
| 3,432,348 | 3/1969 | Jones | 23—1 X |
| 3,249,263 | 5/1966 | Howard | 23—314 |

OSCAR R. VERTIZ, Primary Examiner

G. O. PETERS, Assistant Examiner

U.S. Cl. X.R.

23—271; 266—22